(12) United States Patent
Schou et al.

(10) Patent No.: US 7,263,421 B2
(45) Date of Patent: Aug. 28, 2007

(54) CONTROL UNIT FOR A RESTRAINT SYSTEM

(75) Inventors: Frank Schou, Ditzingen (DE); Klaus Ringger, Nuertingen (DE)

(73) Assignee: Robert Bosch GmbH, Stuttgart (DE)

( * ) Notice: Subject to any disclaimer, the term of this patent is extended or adjusted under 35 U.S.C. 154(b) by 232 days.

(21) Appl. No.: 10/539,920

(22) PCT Filed: Mar. 6, 2004

(86) PCT No.: PCT/DE2004/000444

§ 371 (c)(1),
(2), (4) Date: Jun. 16, 2005

(87) PCT Pub. No.: WO2004/087468

PCT Pub. Date: Oct. 14, 2004

(65) Prior Publication Data

US 2006/0113840 A1 Jun. 1, 2006

(30) Foreign Application Priority Data

Apr. 1, 2003 (DE) ................................. 103 14 676
Oct. 8, 2003 (DE) ................................. 103 46 623

(51) Int. Cl.
*B60R 22/00* (2006.01)

(52) U.S. Cl. ........................................ 701/45; 280/735
(58) Field of Classification Search .................. 701/36, 701/45, 46, 47; 280/734, 735; 180/271, 180/272

See application file for complete search history.

(56) References Cited

U.S. PATENT DOCUMENTS

| 6,290,255 | B1 * | 9/2001 | Stanley et al. | ............... 280/735 |
| 6,587,769 | B2 * | 7/2003 | Otterbach et al. | ............ 701/45 |
| 6,598,900 | B2 * | 7/2003 | Stanley et al. | ............... 280/735 |
| 6,898,498 | B1 * | 5/2005 | Wessels et al. | ............... 701/45 |

FOREIGN PATENT DOCUMENTS

| DE | 100 54 681 | 5/2002 |
| EP | 0 995 646 | 4/2000 |
| EP | 1 239 370 | 9/2002 |

* cited by examiner

Primary Examiner—Richard M. Camby
(74) Attorney, Agent, or Firm—Kenyon & Kenyon LLP

(57) ABSTRACT

A control unit for a restraint system fires all connected pyrotechnic firing elements. The control unit receives for that purpose, via an interface, a software element that configures all the firing circuits and the triggering algorithm for firing all the firing circuits, and that emulates for a safety module sensor values such that the safety module enables all the firing circuits.

8 Claims, 2 Drawing Sheets

CONTROL UNIT FOR A RESTRAINT SYSTEM

BACKGROUND INFORMATION

In certain markets such as Japan, a so-called disposal firing function is required by law in control units for restraint systems. Its purpose is safely to fire or burn off all the pyrotechnic firing and gas generation elements of airbags and belt tensioners when the vehicle is scrapped. The scrapping operation can then proceed without danger from the airbags, and without endangering the environment. In addition, the burned-off pyrotechnic elements do not require laborious disposal, but can be recycled as scrap metal.

SUMMARY OF THE INVENTION

The control unit according to the present invention has the advantage that a software element is fed into the control unit via an already-existing interface, preferably a diagnostic interface, of the control unit; and the software element then configures all the firing circuits and the triggering algorithm for firing all the firing circuits and, for a safety module that checks the sensor values independently of a processor in the control unit and then, as applicable, enables the firing circuits as a function of the check, emulates those sensor values so that the safety module enables all those firing circuits. A triggering instance for all firing circuits is thus simulated. By way of this software element, all the firing elements can then easily be fired without additional connectors by way of the hardware already present, so that disposal firing is thus guaranteed in very simple fashion. Emulation of the sensor values is necessary because the safety pathway cannot be accessed via the diagnostic interface. The software element can also be implemented so that it is merely an instruction that causes activation in the control unit of further software that configures the triggering algorithm and the firing circuits for firing all the firing elements that are present, and emulates the sensor values in order ultimately to fire all the firing elements.

For reasons of uniformity, it is particularly advantageous that the diagnostic interface is either a CAN bus or a K-line. The K-line (communications line) is a standardized hardware interface by way of which, for example, factory or other diagnoses (shop diagnoses) can be made. Advantageously, the processor, the safety module, and at least one sensor module and/or at least one interface module for the connection of external sensors are connected via a bus, the processor emulating the sensor values on the bus so that the safety module checks those emulated sensor values. The so-called serial peripheral interface bus (SPI bus) is advantageously used as the bus. The SPI line itself encompasses five individual lines. Since a synchronous transfer is involved, a Clock line (designated CLK) is present. The Master Out Slave In (MOSI) line is present for data transfer from the master (in this case the processor) to a slave (e.g. a sensor IC or an interface module). The Master In Slave Out (MISO) line, on the other hand, is present for data transfer from a slave to the master. The Chip Select (CS) line is used to select the corresponding slave. An Enable line (designated EN) is used to enable SPI data transfer. The SPI line proceeds from a master and then branches out to the individual slaves, although the SPI line always has the five individual lines. Provision is made in this context for the processor to transfer those emulated sensor values via the MISO line, through which the processor normally receives data, in order thereby to simulate the emulated sensor values to the safety module. For that purpose, the MISO line is connected to an input/output port of the processor for transfer of the emulated sensor values.

A boot loader, which loads the software element and then immediately starts it, is furthermore advantageously provided in the processor. A reset switch, which is provided for restarting the at least one sensor module and safety module, can advantageously also be provided. The firing circuits can also be restarted therewith.

DETAILED DESCRIPTION

Figure 1:
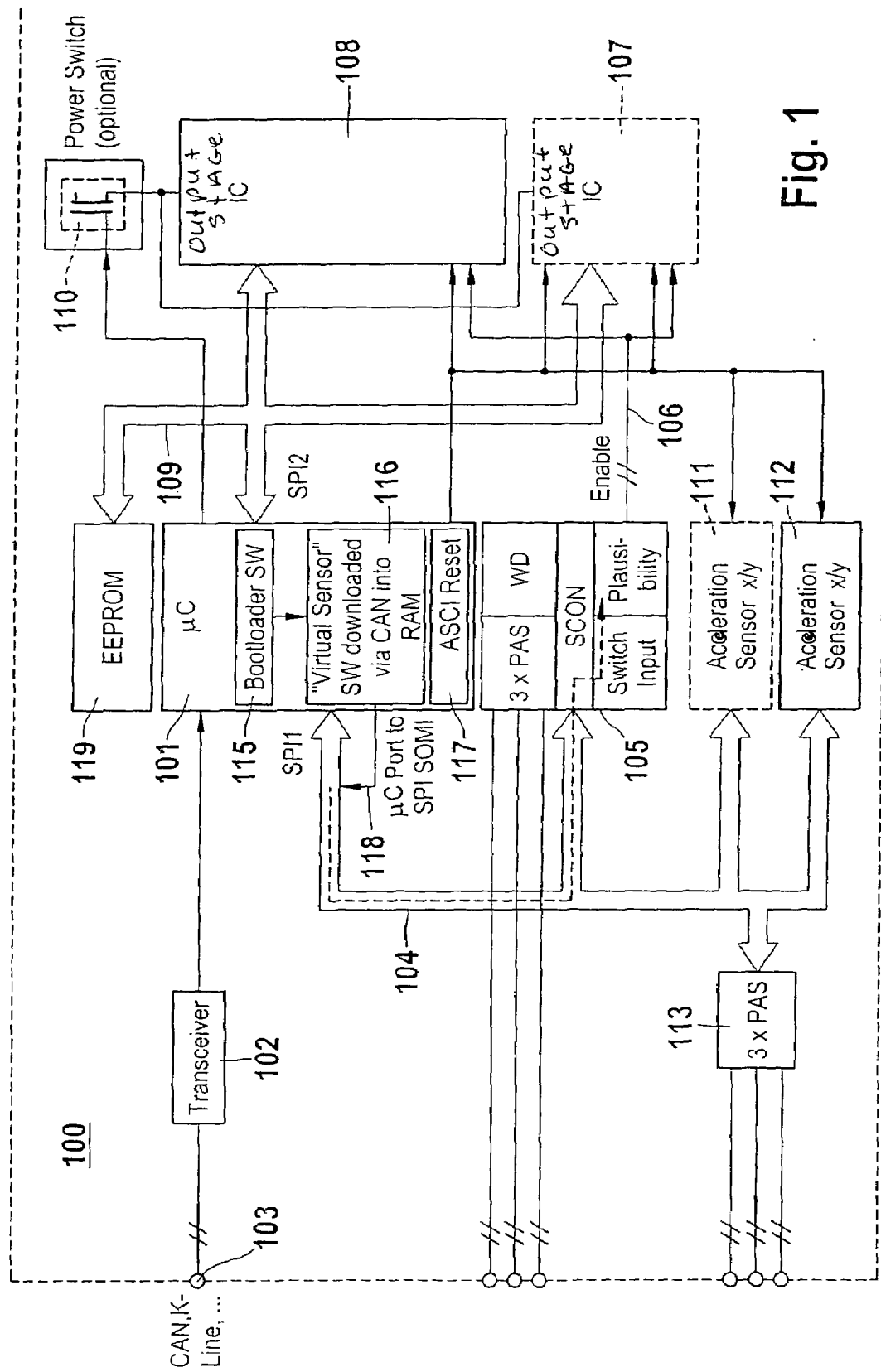
FIG. 1 is a block diagram of the control unit according to the present invention.

A disposal firing concept by way of customer diagnostic interfaces already present in the airbag control unit, such as CAN or K-line, with no additional interfaces, is provided. Existing mechanical and electrical hardware is utilized. What is provided in particular in the context of the control unit according to the present invention is that an independent safety pathway that is implemented by way of a safety module is deceived, by the emulation of such sensor values which indicate a triggering instance for all firing elements.

The processor, which can be a microcontroller, evaluates sensor channels such as acceleration values and rotation rate values that are available in particular via an SPI bus, and processes them in accordance with the implemented algorithms. These are the algorithms which serve to activate the restraint means that are fired via the firing elements, if they are pyrotechnically triggerable restraint means such as airbags or belt tensioners. The microcontroller accesses output stage ICs, i.e. the firing circuits, via a second (in some circumstances) SPI bus. The output stage ICs monitor the firing element and ensure, in the event of triggering, that triggering energy is conveyed to the connected firing elements.

A further IC, referred to here as the safety module, is used to implement the hardware pathway that is independent of the microcontroller. This safety module is connected to the same SPI bus as the sensors and the microcontroller. The safety module can be configured only once after each activation of the control unit, after which no further write access to it can occur. The safety module monitors the sensor data transferred over the SPI bus and compares them with the stored limit values. If a sensor exceeds defined thresholds, this safety module then, independently of the microcontroller, delivers a plausibility signal for the triggering of specific ignition circuits. The safety module is thus made up of circuits that, in terms of their complexity, are much simpler than those of a microcontroller.

According to the present invention a special disposal firing software program, here described as a software element, is loaded into the microcontroller via a diagnostic interface directly into a RAM memory, and stacked there. A so-called boot loader software program is used for this.

The purpose of the disposal firing software program is to operate the control unit using all the signals that make possible uninterrupted operation of the control unit. This includes operating the watchdog and allowing bus communication. A further purpose is to manipulate, i.e. configure, the airbag algorithm in the microcontroller so that the microcontroller enables triggering of all the firing circuits, and fires them. An additional purpose is to cause the safety module to supply plausibility for the output stage ICs.

A further constituent of such a concept can optionally be a simple circuit, controlled by the microcontroller, for resetting the sensor and output-stage ICs as well as the safety module. The boot loader software program controls the reset switch. This circuit makes handling of the disposal firing concept more flexible, since after a reset of this kind, reconfiguration is possible. This can occur independently of the initialization phase of the control unit, at the end of which all the ICs are locked and write access is thereafter impossible. The software element will then emulate a virtual sensor that, via the SPI bus to which the physical sensors and the safety module are connected, feeds emulated sensor data onto the SPI bus. Those emulated sensor data are evaluated by the safety module and cause the safety module to enable the output stage ICs.

FIG. 1 shows control unit 100 according to the present invention in a block diagram. A processor 101, here embodied as a microcontroller, receives, via a transceiver (i.e. an interface module 102) and a diagnostic interface 103, the software element with which disposal firing is performed. Diagnostic interface 103 is in this case a CAN bus or a K-line, or other diagnostic interfaces suitable for the purpose.

In microcontroller 101, the software element is loaded with a boot loader software program 115 out of a RAM serving as memory, and started, so that the software element configures the algorithm for activating output stages in processor 101 as well as the output stages themselves, and performs the sensor emulation. The configuration is such that all the firing elements are activated. The algorithm will accordingly fire all the firing elements. It is possible to start the software element using other programs.

Processor 101 is connected via a first SPI bus 104 to a safety module 105 and two sensor modules 111 and 112, and to an interface module 113 to which external sensors are connected. Via a second SPI bus 109, microcontroller 101 is connected to a memory 119 that is embodied as an EEPROM, to a first output stage IC 108, and to a second output stage IC 107. Processor 101 is optionally connected, via a data output, to a power switch 110 with which energy reserve voltage is switched through to output stages 107 and 108. It is additionally possible for processor 101 to perform a so-called ASIC reset 117, in which output stages 107, 108 and sensor modules 111 and 112 are caused to restart. SPI bus 104 is connected via its MISO line to an input/output port on processor 101, in order to transfer via this actual input line, by way of processor 101, the emulated sensor values of virtual sensor 116 that is constituted by the software element. The input line is thus used as an output line. Safety module 105 is then therefore deceived by means of the emulated sensor values in such a way that it enables output stages 107 and 108 via line 106. Microcontroller 101 will then cause firing of the firing elements via output stages 107 and 108, since the triggering algorithm on microcontroller 101 has been configured by the software element in such a way that triggering can now occur. Safety module 105 also checks and emulates the sensor values of the sensors externally connected via interface module 113. The RAM is associated with processor 101.

Figure 2:
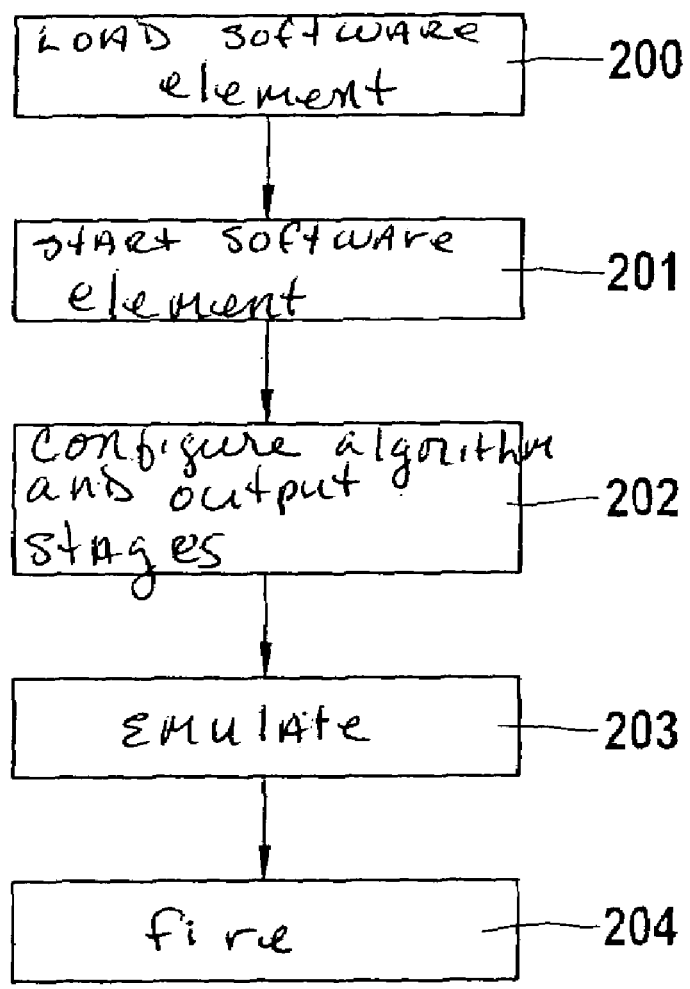
FIG. 2 is a flow chart according to the present invention.

FIG. 2 illustrates what happens in control unit 100. In method step 200, the software element is loaded into processor 101 via interface 103 and transceiver 102, and then stacked by boot loader software program 115. This then occurs in method step 201. In method step 202 the software element, once constituted (started), will then configure the algorithm in processor 101, and output stages 107 and 108, in such a way that firing of all the firing elements can occur. This is possible, however, only if safety module 105 also enables output stages 107 and 108. For that purpose, sensor values that authorize a triggering of all the firing elements are then simulated on bus 104 by the software element via a virtual sensor 116. Safety module 105 then enables output stages 107 and 108 via line 106. Firing of the firing elements by output stages 107 and 108 can then take place in method step 204. Output stage ICs 107 and 108, as well as sensor modules 111 and 112 containing XY sensors, can be restarted for configuration by way of circuit 117 that is associated with processor 101, in order to simplify the configuration of these modules for triggering.

What is claimed is:

1. A control unit for a restraint system for firing all connected pyrotechnic firing elements, comprising:
   a safety module; and
   an interface for receiving a software element which is configured such that as a function of the software element all firing circuits, and a triggering algorithm for firing all the firing circuits, are configured, and sensor values for the safety module are emulated such that the safety module enables all the firing circuits.

2. The control unit according to claim 1, wherein the interface is a CAN bus.

3. The control unit according to claim 1, wherein the interface is a K-line.

4. The control unit according to claim 1, further comprising:
   a bus; and
   a processor connected via the bus to the safety module and to at least one of (a) at least one sensor module and (b) at least one interface module for a connection of at least one external sensor, the processor emulating sensor values on the bus.

5. The control unit according to claim 4, wherein the bus is a serial peripheral interface bus, the processor being the master and being configured in that the processor transfers the emulated sensor values via a MISO line.

6. The control unit according to claim 5, wherein the MISO line is connected to an I/O port of the processor for transfer of the sensor values.

7. The control unit according to claim 4, wherein the processor contains a boot loader software program that loads and starts the software element.

8. The control unit according to claim 4, further comprising at least one reset switch for restarting the at least one sensor module, the safety module and the firing circuits.

* * * * *